Figure 1:
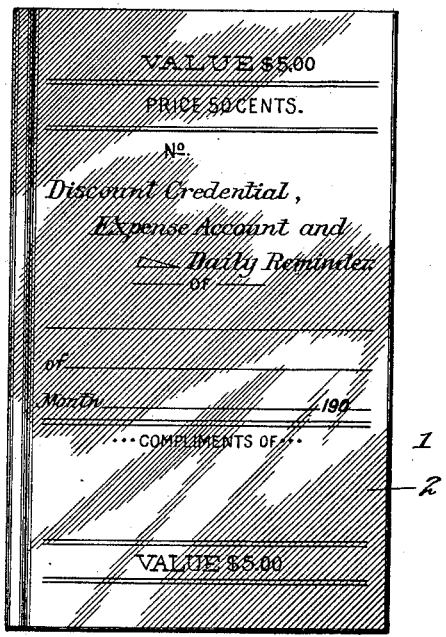

No. 679,741. Patented Aug. 6, 1901.
A. A. GLISSON.
TRADE BOOK.
(Application filed Apr. 30, 1901.)

(No Model.) 3 Sheets—Sheet 1.

A. A. Glisson, Inventor.

Witnesses
Howard K. Orr.
R. M. Elliott.

By
Attorney

No. 679,741.

A. A. GLISSON.
TRADE BOOK.
(Application filed Apr. 30, 1901.)

Patented Aug. 6, 1901.

(No Model.)

3 Sheets—Sheet 2.

Fig. 3.

Notice to Holder:

Business Houses, Hotels and Transfer Companies printed on pages ___ to ___ inclusive, will accept from the Owner hereof (named on the front cover), DISCOUNT-CHECKS from this book during month for which issued, in part payment for purchases or services, on basis of percentages as shown: no single discount to exceed two dollars—($2.00). NOT GOOD UNLESS PRESENTED WITH COVER INTACT.

| Disc't % | DISCOUNT, FIRMS, ETC. | Adv. No. |
|---|---|---|
| | AUSTIN, TEX. | |
| 12 | JOHN DOE | 1 |
| 10 | ---------- | 4 |
| 20 | ---------- | 7 |
| | | |
| | DALLAS, TEX. | |
| 15 | RICHARD ROE. | 2 |
| 12 | ---------- | 3 |
| 10 | ---------- | 5 |
| | | |
| 12½ | FT. WORTH, TEX. | 6 |
| 10 | ---------- | 8 |
| 20 | ---------- | 9 |
| 15 | ---------- | 10 |

Fig. 4.

JOHN DOE.
DEALER IN
MEN'S APPAREL.
HATS,
SHOES,
CLOTHING.
LATEST STYLES
FINEST QUALITY.

2222 W. 15TH. ST.,
AUSTIN, TEX.

Reminders, Engagements, Etc.

| Date | | | 190 |
|---|---|---|---|
| Towns | 1 | 2 | |
| Arrived via | 1 | 2 | R.R. |
| Bus or Carriage (in) | | | |
| Transfer Baggage (in) | | | |
| Meals Enroute | | | |
| Breakfast | | | |
| Dinner | | | |
| Supper | | | |
| Lodging | | | |
| Postal Telegrams (Rec'd) | | | |
| Postal Telegrams (Sent) | | | |
| Transfer Baggage (Out) | | | |
| Bus or Carriage (Out) | | | |
| Fare from | | | |
| Fare to | | | |
| Excess Baggage, to | | | |
| Long Distance Phone | | | |
| Sleeper Fare to | | | |
| Incidentals | | | |
| Total Expense To-day | | | |
| Previous Expense br't frd | | | |
| Grand Total | | | |
| Amount Sales To-day | | | |
| Amount Collections To-day | | | |

REMARKS:

A. A. Glisson, Inventor.

By _____ Attorney

Witnesses
Howard D. Orr
R. M. Elliott

No. 679,741.  
A. A. GLISSON.  
TRADE BOOK.  
(Application filed Apr. 30, 1901.)  
Patented Aug. 6, 1901.

(No Model.) 3 Sheets—Sheet 3.

Fig. 5.

| Adv. No. | BUSINESS REPRESENTATION. | DISCOUNT CHECKS |
|---|---|---|
| 101 | COMMERCIAL HOTEL. HOUSTON, TEX. RATES $3.00 to $5.00  STRICTLY FIRST-CLASS | 1 No. 2c Disc't. / 1 No. 25c Disc't. / 1 No. 2c Disc't. / 1 No. 25c Disc't. / 1 No. 2c Disc't. |
| 102 | | 1 No. 3c Disc't. / 1 No. 20c Disc't. / 1 No. 3c Disc't. / 1 No. 20c Disc't. / 1 No. 3c Disc't. |
| 103 | | 1 No. 5c Disc't. / 1 No. 15c Disc't. / 1 No. 5c Disc't. / 1 No. 15c Disc't. / 1 No. 5c Disc't. |
| 104 | | 1 No. 5c Disc't. / 1 No. 10c Disc't. / 1 No. 5c Disc't. / 1 No. 10c Disc't. / 1 No. 5c Disc't. |
| 105 | | 1 No. 5c Disc't. / 1 No. 10c Disc't. / 1 No. 5c Disc't. / 1 No. 10c Disc't. / 1 No. 5c Disc't. |
| 106 | | 1 No. 10c Disc't. / 1 No. 5c Disc't. / 1 No. 10c Disc't. / 1 No. 5c Disc't. / 1 No. 10c Disc't. |
|  | | 1 No. 10c Disc't. / 1 No. 5c Disc't. / 1 No. 10c Disc't. / 1 No. 5c Disc't. / 1 No. 10c Disc't. |
|  | | 1 No. 15c Disc't. / 1 No. 5c Disc't. / 1 No. 15c Disc't. / 1 No. 5c Disc't. / 1 No. 15c Disc't. |
|  | | 1 No. 20c Disc't. / 1 No. 3c Disc't. / 1 No. 20c Disc't. / 1 No. 3c Disc't. / 1 No. 20c Disc't. |
| 107 | | 1 No. 25c Disc't. / 1 No. 2c Disc't. / 1 No. 25c Disc't. / 1 No. 2c Disc't. / 1 No. 25c Disc't. |

Fig. 6.

| Adv. No. | BUSINESS REPRESENTATION. | SUMMARY |
|---|---|---|
| 115 | | DATE / SALES / EXPENSES |
| 116 | | 1–31 |
| 117 | | |
| 118 | | |
| 119 | | |
| 120 | | TOTALS. Average Sales per day. Average Expenses per day. Salary or Commissions per day. Per Cent of Expenses to Sales— |
| 121 | | |

A. A. Glisson, Inventor.

By E. G. Siggers, Attorney

Witnesses  
Howard D. Orr  
R. M. Elliott

UNITED STATES PATENT OFFICE.

AMOS A. GLISSON, OF FORT WORTH, TEXAS.

TRADE-BOOK.

SPECIFICATION forming part of Letters Patent No. 679,741, dated August 6, 1901.

Application filed April 30, 1901. Serial No. 58,183. (No model.)

*To all whom it may concern:*

Be it known that I, AMOS A. GLISSON, a citizen of the United States, residing at Fort Worth, in the county of Tarrant and State of Texas, have invented a new and useful Trade-Book, of which the following is a specification.

This invention relates generally to trade-books, and specifically to a book constituting at once an advertising medium, discount credential, expense account, and daily reminder, and incidentally a diary.

The objects of the invention are to create, hold, and increase the trade of advertisers employing this system; to render advertisements equally valuable to advertisers, irrespective of the place or space occupied in the book or advertising medium; to enable advertisers to judge or closely approximate the value accruing to their business from advertising under this system; to afford thorough and direct protection to advertisers against excessive charges for advertising, which while necessary for increasing business would at times be unwarranted under certain conditions of trade.

The object stated under the first head is accomplished through distribution of the discount credentials to buyers or consumers at regular intervals, either with the compliments of the advertisers or at a fixed price, such credentials containing the advertisement of the distributer and presenting elements of but temporary yet substantial value, the credentials being limited as to circulation, as to value, and as to length of time of validity, the circulation of the credentials to be confined within specific limits or boundaries, as opposed to extensions of circulation over as large an area as possible, as is common to all other advertising mediums or systems.

The object stated under the second head is accomplished through the use of a definite system giving the names of advertising firms, &c., and their city or town and street addresses, and through the use of numbers for all advertisements setting forth the lines or classes of business in which the advertisers are engaged.

The object stated under the third head is accomplished by making it necessary for purchasers or consumers to indicate whether advertising induced their patronage in order to secure benefits of the limited discounts of trade offered under this system, thereby affording the advertiser a test or evidence of the value of advertising, a result not possible in the use of newspapers, magazines, periodicals, and other advertising mediums.

The object stated under the fourth head is accomplished through the limitation of value of the credentials as to time, length of validity, maximum single discount allowable, limitations of discount-checks to a certain amount per book, the issuance of the credentials in monthly issues only, the limitations of circulation to a certain basis per thousand of population of the respective or specific cities, towns, or sections interested, and by effecting the advertising upon a basis of subscription for the credentials rather than by a specific charge for advertising representations or for the space occupied by such advertisements.

Under the above provisions all advertisers are in position to contribute in a definite way either toward the enlargement or restriction of circulation in their respective sections or communities, according as circumstances dictate, provision being made that under no circumstances shall the total circulation per month exceed a given or limited number of credentials based upon the population of the section in which the credentials are employed.

The advantages attending the employment of the system embodying the subject-matter of this application are that a direct coöperation between the manufacturers of the credentials and the merchants or advertisers is effected as opposed to the use of advertising agencies or subagencies, whereby the expense of establishment and maintenance of such agencies is obviated, and that in so far as possible a cash system of doing business is effected as opposed to a credit system of doing business, thereby placing a premium upon cash business and obviating the necessity, with attendant trouble, expense, and risks, of keeping accounts with and in favor of or against holders of credentials, thus in a marked degree contributing toward enabling dealers likewise to purchase their goods upon a cash basis, resulting in saving to them such discounts in cash as are usual between wholesale dealers and manufacturers and retailers.

The employment of the system is attended with the further advantage of discount allowances at the time of purchase to credential holders and the further protective advantages of limiting the discounts of any one transaction to a certain amount and of confining all interested persons to the use of but one coupon-sheet for each book or credential, thereby avoiding the necessity of the employment of credentials that are cumbersome because of weight or size and effecting saving in the expense of extra cost of the material and printing, as would otherwise be necessary.

The advantage accruing from the employment of a direct intercommunicable or intertown system is in part the obviation of necessity for advertising agencies or subagencies for distribution purposes or for the purpose of arriving at convenient settlements with purchasers holding credentials, the credentials under this system to be distributed to dealers or advertisers direct by the manufacturers upon a subscription basis and at a set price per copy and with advance advertising contracts to cover, and, further, the reduction of expense of publication by concentrating the advertisements of the dealers of several communities of a county or State within the covers of each copy of each edition issued in their joint behalf as opposed to the expense of separate editions for each community, the enlarged benefits to both the dealers and advertisers and to the purchasers or holders of credentials arising from the fact that the credentials are available for use by tourists, commercial travelers, and other persons who travel more or less in the various communities rather than in only one community. This system is strongly differentiated or opposed to systems capable of being operated only as a separate and distinct proposition in a town or of being operated only in connection with advertising agencies or those systems in which no provision is made for designating the various discounts allowable to purchasers, in the absence of which purchasers or consumers residing in the country or in any city or town could not be kept informed as to the various discounts allowable or changes therein as offered by merchants of other towns or communities. Under the systems last referred to there is a failure to contemplate or provide for non-transferable credentials or for designating the owners of the distributed credentials, so that without provision of means to prevent indiscriminate distribution, as by the employment of some check or indicating means, it would be impossible for the owner of the book, should he lose it, to tell by the credentials given to a merchant whether those credentials belonged to him or to another.

Under the present system, as pointed out, it is proposed to limit the circulation of the credentials, to limit their time validity—that is to say, the length of time in which the credentials are good for discounts—and to limit to a certain figure or amount the discounts allowable in any one transaction, without which, as a part of this system, advertisers could not satisfactorily, effectively, or even legitimately increase or decrease their discount offers from time to time or at set or stated intervals for the sake of business safety, and, further, should advertisers make such changes of discount offers or per cents. arbitrarily as against outstanding and unlimited credentials such action on the part of the advertiser would necessarily be at the risk of embarrassment, since without the use of a time-validity safeguard holders of outstanding credentials would be in a position to demand any discounts previously effective or obtainable, regardless of how or when such holders may have gained possession of such credentials. The features of the time validity and maximum single discount may prove valuable to dealers or advertisers at any time through the changes of business elements and environment, such as increase or decrease of competition or of rental or other expenses or through changes of business locations, &c., as well as for other reasons.

Under the limitations employed in this system the advertisements will have greater power, because concentrated and because they will have to be perused in order to ascertain those merchants giving discounts, this system contemplating, as before pointed out, the placing or distribution among purchasers or consumers of but a limited number of credentials from month to month upon a basis of about one credential for every one hundred and fifty population of the cities or towns in which operated, such distribution to be in favor of different persons from time to time, the time-validity feature in connection with this system giving an advantage of inducing trade within specific cycles or periods of time and of retaining its novelty through its mode of operation and the presentation of a practical means or medium of carrying or maintaining accounts of current traveling expenses and daily reminders of future engagements, &c., thereby making the medium trebly useful and forcing the discount proposition and advertisements before the holder with never-varying constancy.

A further advantage of the system is in the security accorded to the owner of the credential-book by having designated upon or within the cover of each credential with ink or in any other definite manner the name and address of the party (purchaser) to whom issued and of making the credentials non-transferable, thus enabling merchants or advertisers to keep a record of the numbers of the credentials and of their issue, in connection with the names and addresses of parties to whom issued, so as satisfactorily and effectually to change their favors of distribution from month to month, and, further, to avoid honoring such credentials in the hands of wrong parties.

As further indicating the advantages accruing from the employment of a system such as defined and somewhat to reiterate what has before been said the use of advertising agencies established for either the purpose of distribution or for the making of convenient settlements with holders of cards, sheets, or books, as in systems now in vogue, is obviated, since as in my system the credentials or advertising mediums are sold to dealers or advertisers upon a basis of subscription with advance contracts to cover, and they can be issued direct to such subscribing dealers or advertisers from the hands of the credential manufacturers, thus avoiding the necessity and expense of handling or distributing through advertising agencies or subagencies.

The cost or expense of publication is greatly reduced by concentrating the advertisements of the dealers of several communities of a county or State within the covers of each copy of each edition issued in their joint behalf, as opposed to separate issues or editions for each community, thereby avoiding the necessity and expense of a greater number of editions and of frequent changes of advertising copy, which would thereby be a necessary and extra expense.

With the objects stated in view the invention consists in the book constituting a discount credential, expense account, and daily reminder, as will be hereinafter fully described and claimed.

In the accompanying drawings, forming a part of this specification, and in which like numerals of reference indicate corresponding parts, I have illustrated diagrammatically a form of the embodiment of my invention, it being understood that the same may be departed from in the manner and order of arrangement of its parts without departing from the spirit of the invention, and in these drawings—

Figure 2:
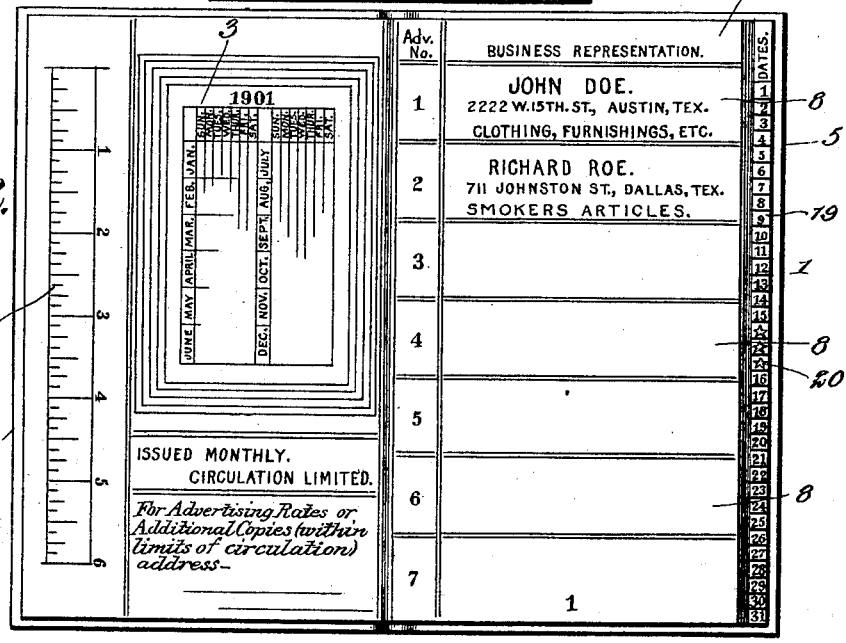

Figure 1 is a view in elevation, exhibiting the outer cover of the book. Fig. 2 is a similar view showing the inside of the outer cover of the book and the first page of the book. Fig. 3 is a similar view showing the inside of the first page and page three of the book. Fig. 4 is a similar view showing pages fourteen and fifteen of the book. Fig. 5 is a similar view showing pages eighty-eight and eighty-nine of the book. Fig. 6 is a similar view showing the last page of the book and the inside of the book-cover.

In the specification the numbers written out thus, "one," "two," "fourteen," "fifteen," &c., refer to the page-number at the bottom of the representations of the different pages of the book, and the numerals "1," "2," &c., refer to the parts of the book and pages thereof.

Referring to the drawings, 1 designates a book, the same in this instance having bound between its covers ninety-two pages; but it is to be understood that I do not limit myself to this number of pages, as they may be increased or diminished without departing from the spirit of the invention. The front cover 2 of the book is provided with printed matter stamped into or otherwise exhibited on the cover, indicating the value of the discount credits contained in the book, the price of the book, the number of the book, the name of the owner and his residence, together with the month in which the discount coupons are available or valid, and the name of the firm issuing the book, the space occupied by this matter in the present illustration of the cover being left blank. On the inside of the front cover 2 is to be pasted or otherwise exhibited a calendar 3, together with certain printed matter, for the use of the advertisers or users of the book, the cover also being provided with a printed measuring-rule 4 for the convenience of the user of the book.

The leaves or pages of the book are divided into groups or sections under the following headings, namely: "Business representation," as indicated by pages one, eighty-eight, and ninety-two; "Discount firms, &c.," as indicated by page three; "Expense account and daily reminder," as indicated by pages fourteen and fifteen; "Discount checks," of which there is but one sheet, as indicated by page eighty-nine.

The inside of the back cover 5 of the book is provided with a page 6, headed "Summary," suitably ruled to accommodate entries for a month, that being the period of time for which the books are issued, the "Summary" containing a "Date" column for thirty-one days, a "Sales" column, and an "Expense" column, the columns being preferably arranged vertically, and a "Totals" line, "Average sales per day" line, "Average expenses per day" line, "Salary or commissions per day" line, and "Per cent. of expense to sales" line. On this summary in a small space and in a concise and business-like form may be entered the entire sales amount, expense account, and other data for a month, this presenting a feature that will be found of great advantage to traveling men.

As shown, the "Business representation" pages are embraced in pages one, eighty-eight, and ninety-two, this arrangement being due to the fact that in binding the book the pages come in this order; but it is to be understood that they may be arranged in regular order from one up to as many pages as may be required. These pages (designated by 7) are divided by horizontal lines into divisions 8 and are provided on the left-hand side with a column headed "Adv. No.," indicating advertising or advertisement number; and in this column, opposite each division 8—wherein appears the name of a merchant, his street address, town or city address, and line of goods handled—will be a number beginning with the number one and corresponding through the succeeding pages to the number of the advertisement-spaces 8, in this instance (as shown by Fig. 6 on the representation of page ninety-two) running up to one hundred and twenty-one. The advertisement-number refers to the "Discount firms, &c.," series of pages, one of these being shown in Fig. 3 as page three. Page two (shown in this figure) represents the inner side of the page one and contains a printed notice to the holder relative to the firms advertising in the book and the other descriptive matter to guide the user in the proper employment of the book, the notice constituting a contract. The "Discount firms, &c.," pages each has two columns 9 and 10, respectively, the column 9 containing the discounts given by the firms and the column 10 containing the number of the advertiser, this latter referring over to the "Business representation" pages. On the "Discount firms, &c.," page (designated 11) will appear the city or cities in the community or section of country using this system and the name of the merchant, these being arranged alphabetically. Thus on the sheet indicated by 11 appears "Austin, Texas, John Doe," "Dallas, Texas, Richard Roe," and so on. By referring to the advertising-column 10 at the right of the name "John Doe" it will be seen that his advertisement-number is one, and by turning to the "Business representation" page (designated by 7) and looking in the first division, which will be advertisement-number one, John Doe's full address will be found. The numbers in the discount-column 9—in this instance, twelve, ten, twenty, &c.—refer to the "Discount checks" page, (designated by 12 in Fig. 5.) The "Discount checks" page is divided up into fifty coupons, or more or less, each bearing in this instance the figure one, representing the number of the edition, the abbreviation No. referring to the number of the book and the amount of discount given, such as two cents discount, twenty-five cents discount, and so on. In the use of these coupons the amount of discount will be limited, as in this case, to two dollars, although this amount may be increased or decreased, as may be found necessary in the use of the book or system. To illustrate the manner in which the coupons are to be used, it will be supposed that a person desires to purchase some clothing and that the person lives in Austin, Texas. By turning to the "Discount firms, &c.," page the name of "John Doe, of Austin, Texas," will be found, it being understood that there are to be several firms under the heading of "Austin, Texas," one only, however, being shown in this instance, and after the name of "John Doe" appears the figure "1," this referring to the advertisement-number, and by turning to advertisement-space No. 1, under the head of "Business representation," it will be found that John Doe conducts business at 2222 West Fifteenth street, Austin, Texas, it having been previously ascertained from the discount-column that John Doe gives a discount of twelve cents on the dollar. Suppose the goods purchased amount to enough to entitle the purchaser to fifty cents discount. The coupons necessary to make up this amount will be detached from the "Discount check" sheet by the merchant or salesman, and the amount of the discount will then be subtracted from the amount of the purchase, the merchant or salesman, however, ascertaining by reference to the edition-number the specification of the month for account of which the credential was issued and the name of the rightful owner of the book, as indicated thereon, that he (the purchaser) is entitled to the discount. Instead of following the procedure described above to ascertain the dealer desired the purchaser may first turn to the "Business representation" portion of the book and by looking through the different advertisements obtain the desired information.

The "Expense account and daily reminder" shown in Fig. 4 and designated 13 consists of sixty-two pages bound in the regular order, two pages representing one day of the month. One of the pages (fourteen) is provided with a space 14, containing a merchant's advertisement, and below this advertisement is a blank space 15, headed "Reminders, engagements, &c.," which constitutes the "Daily reminder." This page, as also page fifteen, is provided with horizontal lines 16, and page fifteen is further provided with vertical columns 17. On the horizontal lines on page fourteen is printed such matter as will be of use to traveling men—such, for instance, as the date of the month, towns visited, railroads patronized, &c., followed by a list representing the expenditures of a commercial traveler for various purposes, the amount of money expended being entered in the vertical columns 17 of page fifteen. At the bottom of page fifteen there is arranged a space bearing the requisite printed matter to indicate "Total expense to-day," "Previous expense brought forward," &c., the matter contained in this space being carried over into the vertical columns 17 of page fifteen and there footed up, so that at the end of each day the traveling man may know exactly how he stands as to expense and sales, &c., and as to what amount of money he has made. Opposite the words "Towns" and "Arrived via" on the "Expense account and daily reminder" page are two spaces, numbered, respectively, one and two, for use in designating, also respectively, the first and second towns visited and the first and second railroads or routes used upon a given day or date. To the right of the columns 17 there is left a blank space 18, headed "Remarks," and in this space may be entered any matter of importance or of interest to the traveler, this portion of the sheet constituting a diary. Each of the "Expense account and daily reminder" pages is provided with an index 19, referring to the day of the month, and headed by the word "Dates," so that the user can immediately turn to any page or date desired with readiness and ease. Bound in with the "Expense account and daily reminder" pages are in this instance three blank pages, (indicated on the index by stars 20,) these blank pages being provided to give additional space upon which entries extraneous to business matters may be entered. It will be understood that a greater number of blank pages than three may be employed without departing from the spirit of the invention.

From the foregoing description it will be seen that as an advertising medium a book of this character will be of value, for the simple reason that the advertisements of the merchants must be read in order to enable a prospective purchaser to ascertain the class of goods handled by the merchant, the special inducement in the nature of discounts or savings in purchases being constantly manifest. Further, that by the protective features thrown around the coupon or discount-checks it will be practically impossible for an unauthorized person to receive the benefit of the discounts, provision being made for recording all credentials of each edition as issued, so that in case of losses effective notices may be issued, preventing others than the proper owners using the credentials to advantage.

As pointed out, these books are to be issued monthly, so that a person cannot hold the discount-checks for use indefinitely, as in the lapse of time the discounts granted by a merchant might vary accordingly as the price of goods would rise or drop. Thus by limiting the time of use of the coupons to one month the merchant will be at liberty at the end of that time without embarrassment or retraction of his word to change the rate of discount.

As before stated, in distributing to purchasers or consumers upon a complimentary basis it is intended that such distribution shall be in favor of different persons from time to time in so far as possible, so that the benefits accruing from the use of this system will not be confined to a favored few, which, in connection with the time-validity feature, will have the treble effect of inducing trade within the specific cycles or periods of time, of maintaining the novelty of the system, and of placing a definite or decided premium upon each of all issues of the trade-books, the maximum circulation at all times to be limited to a basis of a certain number of credentials per thousand of population of the cities, towns, or sections in which operated.

Where used in a State or in the several counties of a State, the holder of the book will be entitled to discounts in any part of the territory covered by the system, provided, of course, that the advertisement of the merchant with whom it is desired to trade appears in the book.

The manner of arranging the pages of the book, as before pointed out, will be one of choice, and I therefore desire it to be understood distinctly that I do not limit myself to the precise arrangement of pages shown herein or as to disposition of the printed matter and rulings or as to the printed matter spread upon the pages, as additional information may be added to the pages from time to time or be changed and still be within the scope of the invention.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Particular stress is laid on the connection between the contract—*i. e.*, "Notice to holder," the "Discount checks," the "Non-transferable"—characteristic or element and the affixing to the book of the name of the month of issuance, whereby all the discount-checks must be presented during the life of the book, which is one month, and the amount of discount for any sale is not permitted to exceed two dollars. Without these safeguards thrown around the use of the book its value would be of a very limited character.

What I claim is—

1. A book comprising a series of connected though separable discount-checks of different values, a list of names of business-houses with the designated rate of discount allowed by each house, and a separate series of advertisements corresponding to the list of names.

2. A book comprising a page made up of a series of connected though separable discount-checks each having the same designating-number but possessed of different discount values, a page or pages containing a list of names of business-houses, the rate of discount allowed by each, and their advertisement-number, and a separate page or pages containing the advertisements of the aforesaid business-houses arranged in order to correspond with the number in the list.

3. A book comprising a page made up of a series of connected though separable discount-checks each having two numbers, and a discount value, the numbers being uniform and designating, respectively, the number of the edition to which the book belongs—and the number of the book itself, and the discount-checks varying in amounts, a page or pages containing a list of names of business-houses, the rate of discount allowed by each and their advertisement-number, and a separate page or pages containing the advertisements of the aforesaid business-houses arranged in order to correspond with the number in the list.

4. A book comprising a page made up of a series of connected though separable discount-checks each having two numbers, and a discount value, the numbers being uniform and designating, respectively, the number of the edition to which the book belongs—and the number of the book itself, and the discount-checks varying in amounts, a page or pages containing a list of names of business-houses, the rate of discount allowed by each and their advertisement-number, and a separate page or pages containing the advertisements of the aforesaid business-houses arranged in order to correspond with the number in the list, and a contract as an integral part of the book, indicating the time limit within which the discount-checks must be used.

5. A book comprising a page made up of a series of connected though separable discount-checks each having two numbers, and a discount value, the numbers being uniform and designating, respectively, the number of the edition to which the book belongs—and the number of the book itself, and the discount values of the checks varying in amounts, a page or pages containing a list of names of business-houses, the rate of discount allowed by each and their advertisement-number, a separate page or pages containing the advertisements of the aforesaid business-houses arranged in order to correspond with the number in the list, and a contract as an integral part of the book, indicating the time limit within which the discount-checks must be used, the front cover of the book to bear the name of the owner, the number of the book, and the month issued.

In testimony that I claim the foregoing as my own I have hereto affixed my signature in the presence of two witnesses.

AMOS A. GLISSON.

Witnesses:
A. J. LANDEGARD,
W. J. WARRINER.